United States Patent
Cai

(10) Patent No.: US 12,420,194 B2
(45) Date of Patent: Sep. 23, 2025

(54) CONTROLLING GROUP MOVEMENT OF NON-PLAYER CHARACTER VIRTUAL OBJECTS

(71) Applicant: Tencent Technology (Shenzhen) Company Limited, Guangdong (CN)

(72) Inventor: Fenlin Cai, Shenzhen (CN)

(73) Assignee: TENCENT TECHNOLOGY (SHENZHEN) COMPANY LIMITED, Guangdong (CN)

( * ) Notice: Subject to any disclaimer, the term of this patent is extended or adjusted under 35 U.S.C. 154(b) by 301 days.

(21) Appl. No.: 18/203,945

(22) Filed: May 31, 2023

(65) Prior Publication Data

US 2023/0302361 A1 Sep. 28, 2023

Related U.S. Application Data

(63) Continuation of application No. PCT/CN2022/133965, filed on Nov. 24, 2022.

(30) Foreign Application Priority Data

Feb. 28, 2022 (CN) .......................... 202210185345.3

(51) Int. Cl.
  A63F 13/56 (2014.01)
  A63F 13/837 (2014.01)
(52) U.S. Cl.
  CPC ............ *A63F 13/56* (2014.09); *A63F 13/837* (2014.09)

(58) Field of Classification Search
  CPC ........ A63F 13/56; A63F 13/837; A63F 13/35; A63F 13/67; A63F 13/5378; A63F 13/847; A63F 2300/308; A63F 2300/8076
  See application file for complete search history.

(56) References Cited

U.S. PATENT DOCUMENTS

2002/0045470 A1* 4/2002 Atsumi .................. A63F 13/10
                                                          463/9

FOREIGN PATENT DOCUMENTS

| CN | 111773696 A | 10/2020 |
| CN | 112402970 A | 2/2021 |

(Continued)

OTHER PUBLICATIONS

Dataverse 01 Wiki, "Zombie Horde Leader," Aug. 11, 2021, https://dv-01.fandom.com/wiki/Zombie_Horde_Leader?oldid=153 (Year: 2021).*

(Continued)

*Primary Examiner* — Kevin Y Kim
(74) *Attorney, Agent, or Firm* — ARENTFOX SCHIFF LLP

(57) ABSTRACT

A virtual object control method includes displaying a virtual environment picture of a virtual environment including a first virtual object, and determining a leader virtual object from among at least two non-player character virtual objects in response to a determination that the first virtual object is within an attack range of the at least two non-player character virtual objects. A non-leader virtual object of the at least two non-player character virtual objects moves towards the leader virtual object. The method further includes displaying, in the virtual environment, group movement of the at least two non-player character virtual objects led by the leader virtual object towards the first virtual object.

20 Claims, 8 Drawing Sheets

(56) References Cited

FOREIGN PATENT DOCUMENTS

JP  2002-074396 A  3/2002
JP  2010-124874 A  6/2010

OTHER PUBLICATIONS

Office Action received for Chinese Patent Application No. 202210185345.3, mailed on May 31, 2024, 22 pages (11 pages of English Translation and 11 pages of Original Document).
International Search Report issued Feb. 16, 2023 in Application No. PCT/CN2022/133965, pp. 1-9.

* cited by examiner

CONTROLLING GROUP MOVEMENT OF NON-PLAYER CHARACTER VIRTUAL OBJECTS

RELATED APPLICATIONS

This application is a continuation of International Application No. PCT/CN2022/133965, filed on Nov. 24, 2022, which claims priority to Chinese Patent Application No. 202210185345.3, entitled "VIRTUAL OBJECT CONTROL METHOD AND APPARATUS, TERMINAL, STORAGE MEDIUM AND PROGRAM PRODUCT" and filed on Feb. 28, 2022. The disclosures of the prior applications are hereby incorporated by reference in their entirety.

FIELD OF THE TECHNOLOGY

Embodiments of this application relate to the field of computer and Internet technologies, including a virtual object control method and apparatus, a terminal, a storage medium and a program product.

BACKGROUND OF THE DISCLOSURE

At present, in game application programs, the control of artificial intelligence (AI) objects has important influence on the player experience. The AI object may be a virtual character controlled by a non-player, such as a virtual character controlled by a terminal.

By taking player versus environment (PVE) game as an example, relevant technologies have a universal logic template, that is, each AI object executes the universal logic template. For example, in a virtual game scenario of PVE games, the AI object taking the virtual object controlled by the player as an attack target respectively executes the independent universal logic template so as to pursue and attack a virtual object controlled by the player.

However, in a pursuit process, due to uncontrollable factors such as different initial positions and different pathfinding paths of the AI object, mutual collision and squeezing between the AI objects, and the like, the AI objects may gradually get lost in game levels, and even get out of the battle, which leads to low controllability of the position of the AI object, chaotic game pictures, and scattering of the AI objects in various positions of the game picture, so that the player needs to frequently switch the orientation of the virtual object to fight back against the AI objects scattered in different positions and different directions before continuing the game, the interaction difficulty of the player is high, and the game experience of the player is seriously affected.

SUMMARY

In an embodiment, a virtual object control method includes displaying a virtual environment picture of a virtual environment including a first virtual object, and determining a leader virtual object from among at least two non-player character virtual objects in response to a determination that the first virtual object is within an attack range of the at least two non-player character virtual objects. A non-leader virtual object of the at least two non-player character virtual objects moves towards the leader virtual object. The method further includes displaying, in the virtual environment, group movement of the at least two non-player character virtual objects led by the leader virtual object towards the first virtual object.

In an embodiment, a virtual object control apparatus includes processing circuitry configured to display a virtual environment picture of a virtual environment including a first virtual object, and determine a leader virtual object from among at least two non-player character virtual objects in response to a determination that the first virtual object is within an attack range of the at least two non-player character virtual objects. A non-leader virtual object of the at least two non-player character virtual objects moves towards the leader virtual object. The processing circuitry is further configured to display, in the virtual environment, group movement of the at least two non-player character virtual objects led by the leader virtual object towards the first virtual object.

In an embodiment, a non-transitory computer-readable storage medium stores computer-readable instructions thereon, which, when executed by processing circuitry, cause the processing circuitry to perform a virtual object control method. The method includes displaying a virtual environment picture of a virtual environment including a first virtual object, and determining a leader virtual object from among at least two non-player character virtual objects in response to a determination that the first virtual object is within an attack range of the at least two non-player character virtual objects. A non-leader virtual object of the at least two non-player character virtual objects moves towards the leader virtual object. The method further includes displaying, in the virtual environment, group movement of the at least two non-player character virtual objects led by the leader virtual object towards the first virtual object.

BRIEF DESCRIPTION OF THE DRAWINGS

To describe the technical schemes of the embodiments of this disclosure more clearly, the accompanying drawings required for describing the embodiments are introduced briefly below. The accompanying drawings in the following description show only some embodiments of this disclosure, and a person of ordinary skill in the art may still derive other drawings from these accompanying drawings.

DESCRIPTION OF EMBODIMENTS

To make the objectives, technical schemes, and advantages of this disclosure clearer, implementations of this disclosure are further described in detail below with reference to the accompanying drawings.

According to an aspect of the embodiments of this disclosure, a virtual object control method is provided. The virtual object control method may be applied to, but not limited to a game terminal application (abbreviated as APP) fulfilling an established game task in a virtual scenario, such as a player VS environment (PVE) (also referred to as VS character) game, the game task may be, but not limited to a game task fulfilled by interaction between a virtual character controlled by a current player in the virtual scenario and a virtual character controlled by a terminal through human-computer interaction operation. The game task here may be, but not limited to, run in the APP (such as the non-independent game APP) in a form of plug-ins and applets, or in the APP (such as the independent game APP) in a game engine. The types of the above game APP may include, but are not limited to, at least one of the following: two dimension (2D) game APP, three dimension (3D) game APP, virtual reality (VR) game APP, augmented reality (AR) game APP, and mixed reality (MR) game APP. The foregoing is merely an example, which is not limited in this embodiment.

Player VS environment (PVE): PVE is a game mode in which the players control virtual objects to fight against AI objects (usually opponent objects) generated in the game according to certain logic in order to win.

Multiple AI objects: Multiple AI objects refer to that the players need to face multiple (2 or more) AI objects simultaneously in a virtual game confrontation, and the AI objects may simultaneously pursue and attack the player.

Figure 1:
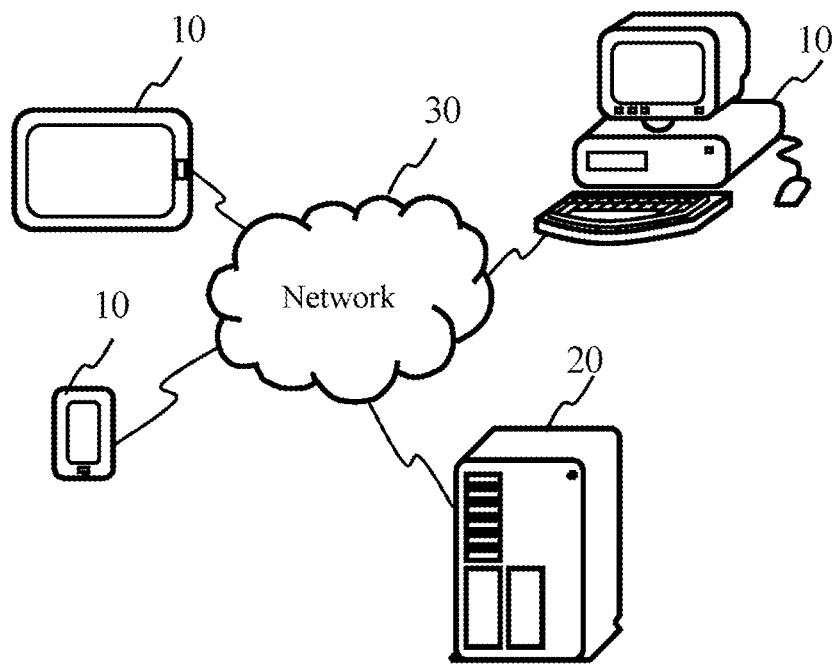
FIG. 1 is a schematic diagram of a scheme implementation environment according to an embodiment of this disclosure.

Referring to FIG. 1, FIG. 1 is a schematic diagram of a scheme implementation environment according to an embodiment of this disclosure. The implementation environment may include: a terminal 10 and a server 20.

The terminal 10 may be a phone (such as an Android phone, an iOS phone, and the like), a notebook computer, a tablet computer, a palmtop computer, a mobile Internet device (MID), a PAD, a desktop computer, a smart television, and the like. A client of a target application program may be installed in the terminal 10, such as the client of game application programs, simulative application programs, and the like.

The server 20 is configured to provide a background service for the client of the target application program (such as the game application program) in the terminal 10. For example, the server 20 may be a background server of the application program (such as the game application program). The server 20 may be one server, a server cluster composed of a plurality of servers, or a cloud computing service center.

The terminal 10 may communicate with the server 20 by using a network 30. The network 30 may include, but is not limited to: a wired network and a wireless network, the wired network includes: local area network, metropolitan area network, and wide area network, and the wireless network includes: Bluetooth, WIFI, and other networks realizing the wireless communication.

In related technologies, with the progress of the game, the virtual object controlled by the player may encounter a large number of AI objects. Skills and positions of these AI objects vary widely. However, in the practical game experience, and especially in 3D real-time shooting games, the virtual object controlled by the player moves constantly, which may lead to the gradual dispersion of a large number of AI objects in a process of pursuing and attacking the virtual object controlled by the player, and finally a large number of AI objects are scattered in different positions in the virtual game scenario. The game picture is very chaotic and uncontrollable, and the AI objects gradually get lost in various corners of the level, and even get out of the game, which is beyond the expectation of a game designer.

Exemplarily, the virtual object control method provided by the embodiments of this disclosure takes a client of the game application program as an example. In a process that second virtual objects (i.e. AI objects or non-player character objects) chase a first virtual object (the virtual object controlled by the player), the client acquires at least two second virtual objects taking the first virtual object as an attack target in real time, controls non-boss (non-leader) objects in the at least two second virtual objects to gather towards a boss (leader) object in the at least two second virtual objects, and controls the boss object to lead the non-boss objects to perform the group movement towards the first virtual object, thereby implementing the group control for the second virtual objects taking the first virtual object as the attack target. The problem that the second virtual objects gradually get out of battle or gradually scatter in the process of chasing the first virtual object because the second virtual object (i.e. AI object) executes an independent universal logic template is avoided, so that the position controllability of the second virtual object during the pursuit.

In addition, the second virtual objects are grouped based on the first virtual object, so that the distribution of the second virtual objects in the pursuit scenario is more regular, and the player may perform targeted operations based on the regular distribution of the first virtual object, thereby improving the player experience.

Figure 2:
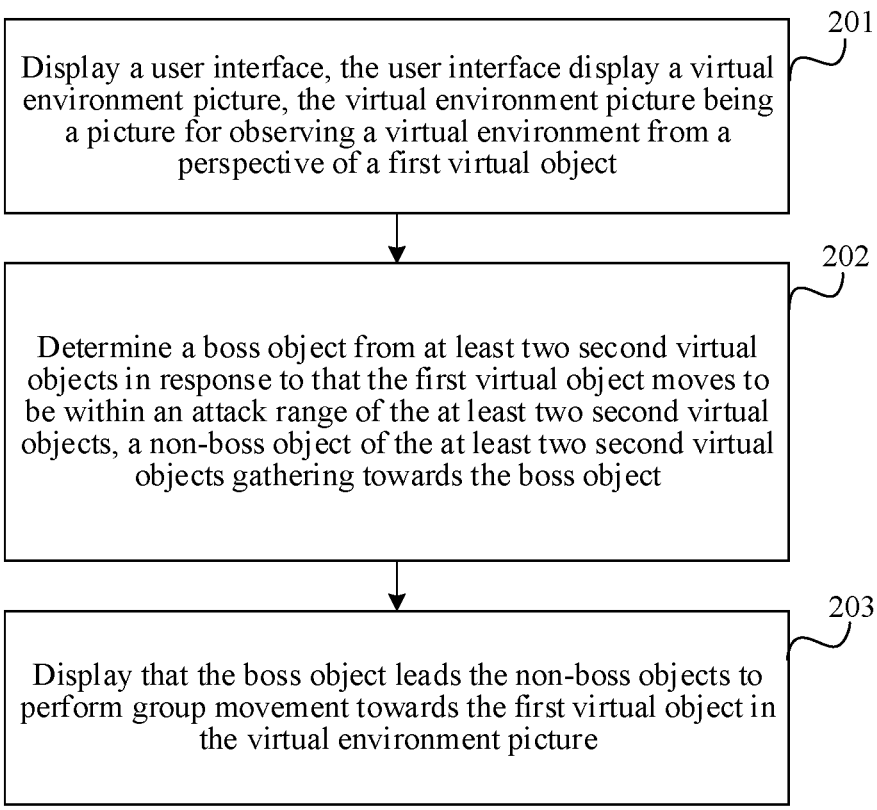
FIG. 2 is a flowchart of a virtual object control method according to an embodiment of this disclosure.

Referring to FIG. 2, FIG. 2 is a flowchart of a virtual object control method according to an embodiment of this disclosure. An execution entity of all steps of the method may be a terminal 10 (such as a client of a target application program in the terminal 10) in a scheme implementation environment shown in FIG. 1. The method may include the following several steps (step 201 to step 203):

Step 201: Display a user interface, the user interface displaying a virtual environment picture, the virtual environment picture being a picture for observing a virtual environment from a perspective of a first virtual object. For example, a virtual environment picture of a virtual environment including a first virtual object is displayed.

The user interface refers to a display interface of the application program, such as the display interface of the target application program. Exemplarily, in a PVE game application program, the user interface may be the display interface of game levels. The user interface is configured to present the virtual environment corresponding to the game level to a user. In the simulative learning application program, the user interface may be the display interface of a learning scenario. The user interface is configured to present a simulation environment in a learning scenario to the user. In an embodiment, the user interface includes a display layer and a control layer. A display hierarchy of the control layer is higher than the display hierarchy of the display layer. The display layer is configured to display picture information (such as a pursuit picture, a group movement picture, and the like). The control layer is configured to display a user interface (UI) control (such as a movement control, an attack control, and the like).

In the embodiments of this disclosure, the first virtual object may be a virtual character controlled by a player account in the application program, that is, the first virtual object is the virtual character controlled by the player. By taking a shooting game application program as an example, the first virtual object refers to a game character controlled by the player account in the shooting game application program. The first virtual object may be a figure form, an animal, a cartoon or in other forms, which is not limited by the embodiments of this disclosure. The first virtual object may be displayed in a 3D form, or a 2D form, which is not limited by the embodiments of this disclosure.

The virtual environment is an environment displayed (or provided) by the client of the application program (such as the game application program) when running on the terminal. The virtual environment refers to an environment created for the virtual object to perform activities (such as attacking the game level), for example, the virtual environment may be a virtual house, a virtual island, a virtual sky, a virtual land, and the like. The virtual environment may be a simulation environment for the real world, a semi-simulation and semi-fiction environment, and a purely fictional environment, which is not limited by the embodiments of this disclosure.

The virtual environment picture may refer to a picture obtained by the first virtual object observing the virtual environment from a perspective of a first person, a third person, and the like.

Step 202: Determine a boss object from at least two second virtual objects in response to that the first virtual object moves to be within an attack range of the at least two second virtual objects, a non-boss object of the at least two second virtual objects gathering towards the boss object. For example, a leader virtual object is determined from among at least two non-player character virtual objects in response to a determination that the first virtual object is within an attack range of the at least two non-player character virtual objects. A non-leader virtual object of the at least two non-player character virtual objects moves towards the leader virtual object.

The second virtual object refers to a virtual character (a virtual character controlled by a non-player) that is run in the application program according to certain logic, i.e., the AI object. Exemplarily, by taking the PVE game application program as an example, the second virtual object may be an attack unit run in the PVE game application program according to certain logic, such as an opponent virtual character, and wild monsters and elite monsters in game levels, and the like.

The attack range may be set and regulated according to practical use needs. Exemplarily, for different types of second virtual objects, the corresponding attack range may be different in size or different in shape. For example, the attack range of the second virtual object of a long-range attack type is larger than the attack range of the second virtual object of a near-range attack type. In a case that the first virtual object moves to be within the attack range of the second virtual object, the second virtual object may take the first virtual object as an attack target to conduct the actions such as attacking, following movement, and the like. In a case that the first virtual object moves to be within the attack range of the second virtual object, and in a case that the second virtual object has the attack target, the second virtual object may not switch the attack target to be the first virtual object. Otherwise, the second virtual object switches the attack target to be the first virtual object.

Figure 3:
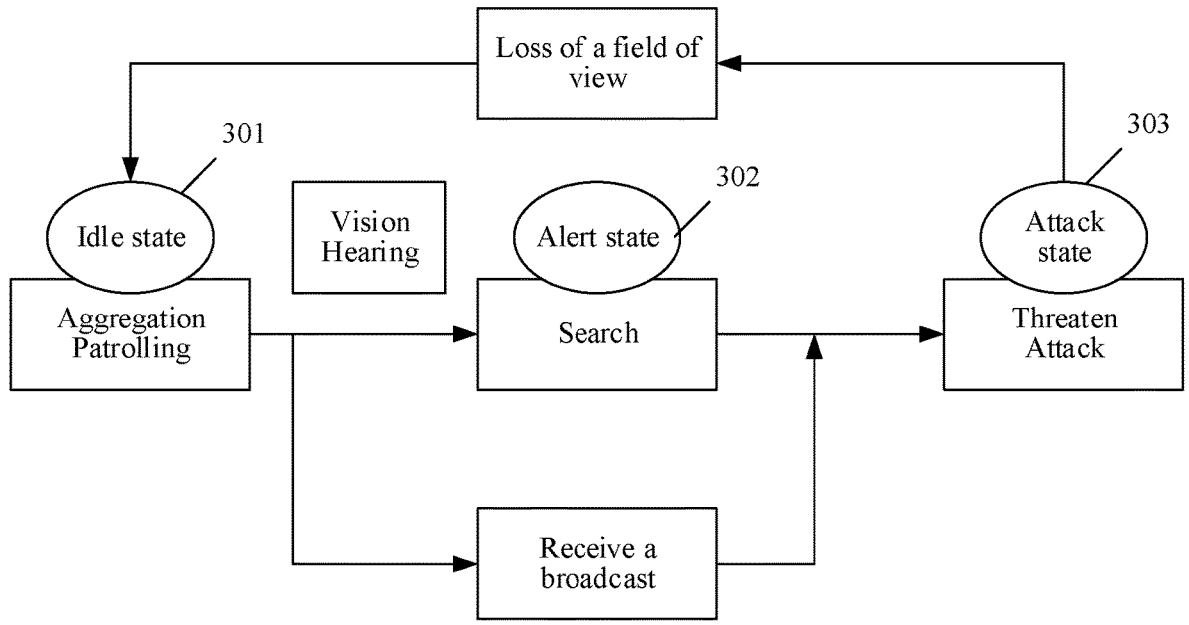
FIG. 3 is a schematic diagram of basic logic of a second virtual object according to an embodiment of this disclosure.

In some embodiments, a determination process of the second virtual object corresponding to the first virtual object may also be as follows:

Referring to FIG. 3, the second virtual object is set in three states: an idle state 301, an alert state 302, and an attack state 303. In an initial state, the second virtual object is in the idle state 301. In the idle state 301, the second virtual object may have the actions such as aggregation, patrolling, and the like. In a case that the second virtual object discovers the first virtual object in manners such as vision, hearing, and the like, the second virtual object enters the alert state 302, begins to move towards the first virtual object, and searches the first virtual object. In a case that the second virtual object in the alert state 302 sees the first virtual object, is attacked by the first virtual object, or receives broadcast (such as a signal indicating a position of the first virtual object, and the like) transmitted by another second virtual object, and the like, the second virtual object is switched from the alert state 302 to the attack state 303, and begins to move towards the first virtual object, that is, takes the first virtual object as the attack target. In a case that the second virtual object moves to a position with a distance to the first virtual object less than or equal to a set distance, the second virtual object begins to attack the first virtual object. In a case that the client detects that the distance between the second virtual object and the first virtual object is greater than or equal to a set threshold (that is, a field of view of the first virtual object is lost), the first virtual object is dead, or the first virtual object quits the application program, and the like, the client controls the second virtual object to change the attack target according to a battlefield situation. In response to no appropriate attack target, the second virtual object is returned to the idle state 301 or the alert state 302.

In the embodiments of this disclosure, the boss object may be the second virtual object integrating an aggregation function and a leading function. For example, the boss object may be used as an aggregation point to gather the non-boss objects. The boss object may also be used as a leader to lead the non-boss objects to perform group movement towards the first virtual object. The non-boss object refers to the second virtual object except for the boss object in the at least two second virtual objects.

Figure 4:
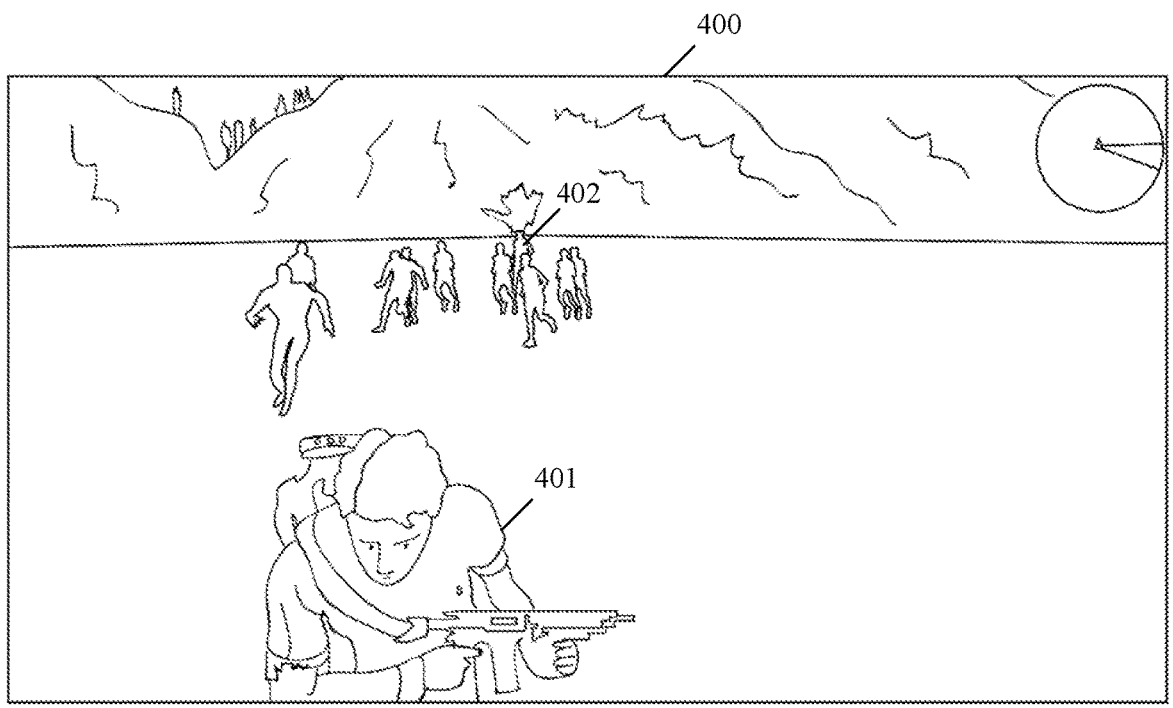
FIG. 4 is a schematic diagram of gathering of non-boss objects towards a boss object according to an embodiment of this disclosure.

Exemplarily, referring to FIG. 4, in the user interface 400, the first virtual object 401 moves to be within the attack range of a plurality of second virtual objects in FIG. 4, and the plurality of second virtual objects all take the first virtual object 401 as the attack target. The plurality of second virtual objects gather around the first virtual object 402 (i.e. the boss object). The first virtual object 401 is a virtual character controlled by the player, and the second virtual object is the AI object.

There may be a plurality of first virtual objects in the virtual environment, and each first virtual object may correspondingly have the boss object and the non-boss objects. The non-boss objects corresponding to each first virtual object gather towards the boss object corresponding to each first virtual object.

In an example, a determination process of the boss object may be as follows:

a boss priority respectively corresponding to the at least two second virtual objects is acquired, and the boss priority is used for indicating the priority that the second virtual object is determined as the boss object; a distance between the at least two second virtual objects and the first virtual object is acquired respectively; and the boss object is determined from the at least two second virtual objects based on the boss priority respectively corresponding to the at least two second virtual objects, and the distance between the at least two second virtual objects and the first virtual object.

The boss priority may be determined based on a level of the second virtual object. For example, the higher the level of the second virtual object, the higher the boss priority of the second virtual object. The boss priority may also be determined based on a type of the second virtual object. For example, in the PVE game application program, the AI object may include an ordinary AI object, an elite AI object and a BOSS AI object, the boss priority of the BOSS AI object is higher than the boss priority of the elite AI object, and the boss priority of the elite AI object is higher than the boss priority of the ordinary AI object. The embodiments of this disclosure do not limit a determination method for the boss priority.

The at least two second virtual objects may be sorted according to an ascending order of the boss priority to obtain a first sequence; the at least two second virtual objects are sorted according to a descending order of the distance to obtain a second sequence; a boss score respectively corresponding to the at least two second virtual objects is determined based on a position of the second virtual object in the first sequence and the second sequence, and the boss score is used for indicating the possibility that the second virtual object is set as the boss object; and the second virtual object with the boss score greater than or equal to a score threshold is determined as the boss object. The second virtual objects with the top set number (such as 1) of the boss score may also be determined as the boss object.

Exemplarily, summation (or weighted summation, and the like) is performed on the position (such as a sequence number) of the second virtual object in the first sequence and the position of the second virtual object in the second sequence, to obtain the boss score of the second virtual object. In a case that the boss score of the second virtual object is greater than or equal to the score threshold, the second virtual object may be determined as the boss object, otherwise, the second virtual object may be determined as the non-boss object. The score threshold may be set and regulated according to the practical use needs, so that the boss score of at least one second virtual object is greater than or equal to the score threshold, that is, at least one boss object may be determined. The second virtual objects within a corresponding set range of each boss are determined as the non-boss objects respectively corresponding to each boss object. The non-boss objects corresponding to each boss object gather towards each boss object.

In another example, the second virtual object includes a first type of second virtual objects and a second type of second virtual objects, the boss priority of the first type of second virtual objects is higher than the boss priority of the second type of second virtual objects, and the boss priority is used for indicating the priority that the second virtual object is determined as the boss object. For example, in the PVE game application program, the first type of second virtual objects may be elite monsters (i.e. AI objects), BOSS monsters, and the like, and the second type of second virtual objects may be ordinary monsters, wild monsters, and the like.

A determination process of the boss object may also be as follows: the first type of second virtual objects closest to the first virtual object in the at least two second virtual objects is determined as the boss object in a case that the at least two second virtual object includes the first type of second virtual objects; and the second type of virtual object closest to the first virtual object in the at least two second virtual objects is determined as the boss object in a case that the at least two second virtual object do not include the first type of second virtual objects.

Figure 5:
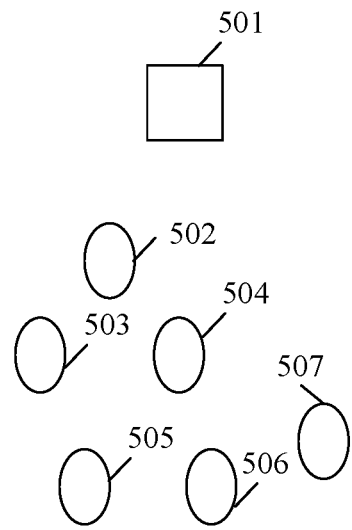
FIG. 5 is a schematic diagram of a boss object determination method according to an embodiment of this disclosure.

For example, referring to FIG. 5, the second virtual object 502, the second virtual object 503, the second virtual object 504, the second virtual object 505, the second virtual object 506 and the second virtual object 507 all take the first virtual object 501 as the attack target. The second virtual object 504 closest to the first virtual object 501 is determined as the boss object in a case that the second virtual object 504 and the second virtual object 506 in the second virtual object 502 to the second virtual object 507 are the first type of second virtual objects. In response to no first type of second virtual object, the second virtual object 502 closest to the first virtual object 501 is determined as the boss object.

In a feasible example, all the second virtual objects of the first type may be determined as the boss objects in a case that the at least two second virtual objects include the first type of virtual objects.

In an embodiment, in a process that the non-boss objects gather towards the boss object, the client acquires the position information of the non-boss objects and boss object in real time, and dynamically regulates an orientation and a gathering movement velocity of the non-boss objects according to the position information of the non-boss objects and boss object.

Exemplarily, in the process that the non-boss objects gather towards the boss object, the orientation of the non-boss objects points to the boss object, the non-boss objects move around the boss object (i.e. moving in eight directions), and the gathering movement velocity of the non-boss objects is in a negative association relationship with the distance between the non-boss objects and the boss object. The gathering movement velocity may also be set in step configuration according to the distance between the non-boss objects and the boss object. For example, the distance of 0.5-10 m corresponds to a first gathering movement velocity, the distance of 10-30 m corresponds to the second gathering movement velocity, and the distance greater than 30 m is the third gathering movement velocity. The third gathering movement velocity is greater than the second gathering movement velocity, and the second gathering movement velocity is greater than the first gathering movement velocity. A minimal distance may also be set between the second virtual objects, such as 0.2 m, 0.5 m, 1 m, and the like, so as to prevent the collision and squeezing between the second virtual objects. In an embodiment, the movement orientation of the non-boss objects points to the boss object.

Step 203: Display that the boss object leads the non-boss objects to perform group movement towards the first virtual object in the virtual environment picture. For example, group movement of at least two non-player character virtual objects led by the leader virtual object towards the first virtual object is displayed in the virtual environment.

In a case that only one boss object is determined from the at least two second virtual objects, the non-boss objects in the at least two second virtual objects gather towards the boss object, and the boss object leads all non-boss objects in the at least two second virtual objects to perform the group movement towards the first virtual object. For example, referring to FIG. 4, in the user interface 400, the boss object 402 leads the non-boss objects to perform the group movement towards the first virtual object 401. The non-boss objects are the second virtual objects except for the boss object 402 in FIG. 4.

Figure 6:
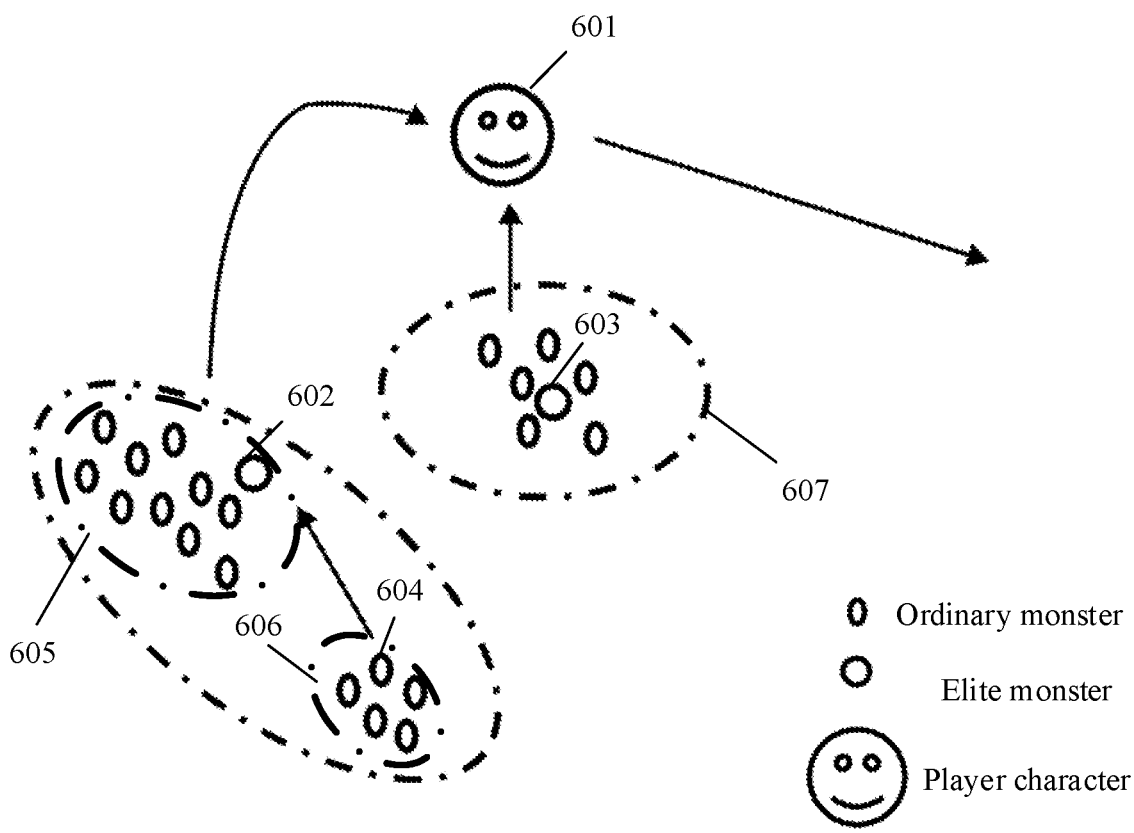
FIG. 6 is a schematic diagram of a plurality of boss objects according to an embodiment of this disclosure.

In a case that a plurality of boss objects are determined from the at least two second virtual objects, the non-boss objects corresponding to each boss object gather towards each boss object, and each boss object leads the non-boss objects corresponding to each boss object to perform the group movement towards the first virtual object. For example, referring to FIG. 6, both the ordinary monster (i.e. second type of second virtual objects) and the elite monster (i.e. first type of second virtual objects) in FIG. 6 take the first virtual object 601 as the attack target. In FIG. 6, there are three boss objects: the boss object 602, the boss object 603, and the boss object 604, and the boss object 602, the boss object 603, and the boss object 604 respectively lead the corresponding non-boss objects to perform the group movement towards the first virtual object 601.

In a process that the boss object leads the non-boss objects to perform the group movement towards the first virtual object, the client acquires the position information of the first virtual object and boss object in real time, and dynamically regulates the movement orientation and movement velocity of the boss object according to the position information of the first virtual object and boss object.

In a process that the boss object leads the non-boss objects to perform the group movement towards the first virtual object, the boss object may be changed according to a practical scenario. A specific content may be as follows:

in an example, in response to the death of the boss object, a new boss object is determined from the remaining second virtual objects corresponding to the at least two second virtual objects. For example, in a case that the boss object is killed by the first virtual object, the method provided in the foregoing embodiments is used for determining the new boss object from the non-boss objects in the at least two second virtual objects.

Or, in a case that the boss object gets out of the battle, the new boss object is determined from the remaining second virtual objects corresponding to the at least two second virtual objects. For example, in a case that the boss object is trapped (for example, the first virtual object releases the skill, and the like), resulting in the loss of the first virtual object, the method provided in the foregoing embodiments is used for determining the new boss object from the non-boss objects in the at least two second virtual objects.

In another example, at least two second virtual objects are determined as group members of an object group corresponding to the first virtual object; in response to that the first virtual object moves to be within the attack range of the new second virtual object, the new second virtual object is added to the object group to obtain an updated object group; and a new boss object is determined from the updated object group. For example, the object group corresponding to the first virtual object includes a second virtual object A, a second virtual object B and a second virtual object C. In a case that the first virtual object moves again to be within the attack range of the second virtual object D, the second virtual object D is added to the object group corresponding to the first virtual object to obtain the updated object group corresponding to the first virtual object, and then the new boss object is determined from the updated object group by the method provided in the foregoing embodiments. The boss object corresponding to the first virtual object may also be reserved without re-determining the boss object.

In a process that the boss object leads the non-boss objects to perform the group movement towards the first virtual object, the boss object may wait for the non-boss objects, and a specific content may be as follows:

in a case that a difference between a maximal distance from the at least two second virtual objects to the first virtual object, and a minimal distance from the at least two second virtual objects to the first virtual object is greater than a fourth distance threshold, the boss objects stop moving, and the non-boss objects in the at least two second virtual objects continue to gather towards the boss object; in a case that a difference between the maximal distance from the at least two second virtual objects to the first virtual object, and the minimal distance from the at least two second virtual objects to the first virtual object is less than or equal to a fifth distance threshold, the boss object continues to lead the non-boss objects to perform group movement towards the first virtual object.

The fourth distance threshold and the fifth distance threshold may be set and regulated according to the practical use need, and the fourth distance threshold is greater than the fifth distance threshold. The fourth distance threshold is used for preventing the non-boss objects from being too scattered, the fifth distance threshold is used for indicating that the non-boss objects are relatively concentrated, that is, an aggregation degree is relatively high.

In a process that the boss object waits for the non-boss objects to gather, the boss object may wave or shout to the non-boss objects. The non-boss objects that are closer to the boss object may also stop moving with the boss object so as to wait for the non-boss objects that are far away from the boss object. In a case that the aggregation degree of the non-boss objects is restored to be relatively high, the boss object continues to lead the non-boss objects to perform group movement towards the first virtual object. In an embodiment, in a case that the distance between the non-boss objects and the boss object is large enough, the boss object does not need to wait for the non-boss objects.

According to the embodiments of this disclosure, by supporting a waiting gathering mechanism, the non-boss objects are prevented from being too scattered, and the chaos of the scenario is avoided, which is conducive to the group control of the second virtual objects.

In an example, an aggregation point is also arranged in the virtual environment. The aggregation point is used for aggregating the second virtual objects. An aggregation priority of the aggregation point is higher than the aggregation priority of the boss object. An application method of the aggregation point may be as follows: the aggregation point in the virtual environment is acquired; at least two second virtual objects gathering towards the aggregation point are displayed in a case of the existence of the aggregation point; and the non-boss objects in the at least two second virtual objects gathering towards the boss object are displayed in a case of no aggregation point.

The aggregation point may be a target position in the virtual environment, such as a door, a fence, a building exit, and the like. Moreover, in different application programs, or at different stages in the application programs, a target set point may be different. The aggregation point may be triggered at a specific moment, in a specific scenario, or at a specific stage.

Figure 7:
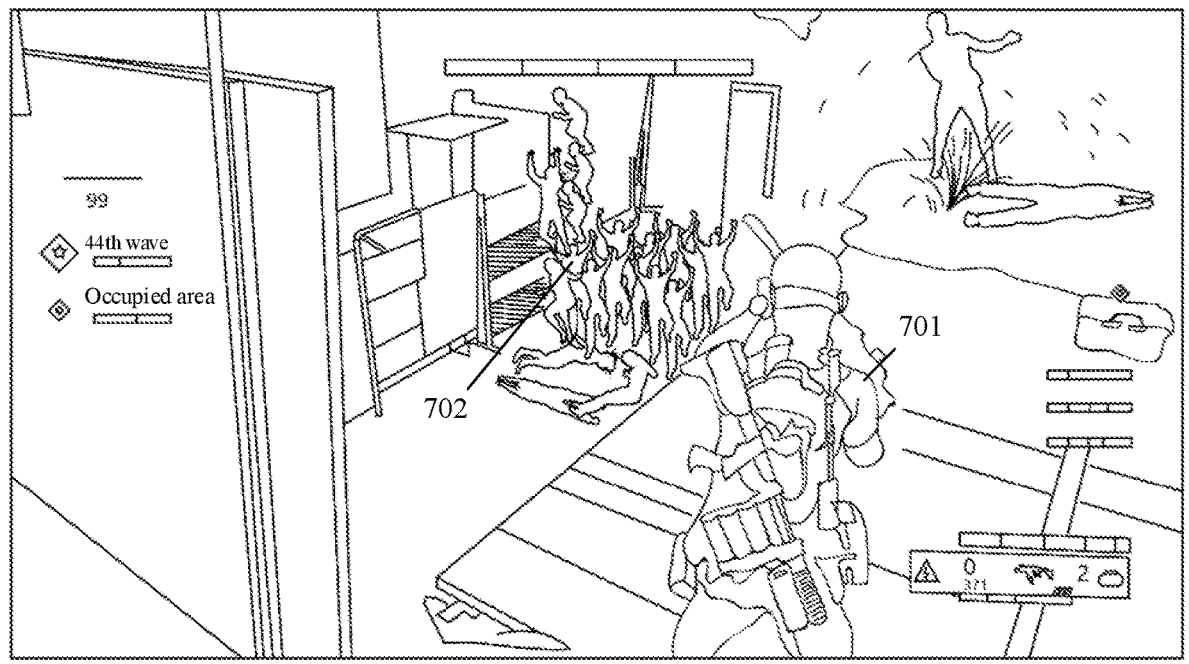
FIG. 7 is a schematic diagram of an aggregation point according to an embodiment of this disclosure.

Exemplarily, referring to FIG. 7, in a case that the first virtual object 701 enters a virtual warehouse, the client activates the aggregation point 702, and at least two second virtual objects gather towards the aggregation point 702 rather than moving towards the boss object.

In an example, at least two second virtual objects may be determined as group members of an object group corresponding to the first virtual object; and in a case that the group members of the object group corresponding to the first virtual object lose the first virtual object, and in a case of the existence of another first virtual object located within the attack range of the group members of the object group corresponding to the first virtual object, the group members of the object group corresponding to the first virtual object are added into the object group corresponding to the other first virtual object.

Exemplarily, the first virtual object A corresponds to an object group A-GROUP. The object group A-GROUP includes at least two second virtual objects. The first virtual object B corresponds to the object group B-GROUP. The object group B-GROUP also includes at least two second virtual objects. In a case that the first virtual object A is dead, gets out of the battle, or quits the application program, the group members in the object group A-GROUP corresponding to the first virtual object A lose the first virtual object A. In a case that the first virtual object B is located within the attack range of the group members of the object group A-GROUP corresponding to the first virtual object A, the group members of the object group A-GROUP are added into the object group B-GROUP corresponding to the first virtual object B. For example, in a case that the first virtual object B is located within the attack range of the boss object in the object group A-GROUP corresponding to the first virtual object A, the group members of the object group A-GROUP are added into the object group B-GROUP corresponding to the first virtual object B. For another example, in a case that the first virtual object B is located within the attack range of a set number of second virtual objects in the object group A-GROUP corresponding to the first virtual object A, the group members of the object group A-GROUP corresponding to the first virtual object A are added into the object group B-GROUP of the first virtual object B.

In a case that a plurality of first virtual objects B are located within the attack range of the group members of the object group A-GROUP corresponding to the first virtual object A, the group members of the object group A-GROUP may be dispersed into a plurality of object groups respectively corresponding to the plurality of first virtual objects, or the group members of the object group A-GROUP may also be added into the object group B-GROUP of the first virtual object B closest to the object group A-GROUP, which is not limited by the embodiments of this disclosure.

In an example, in a process that the boss object leads the non-boss objects to perform group movement towards the first virtual object, in response to an attack instruction transmitted by the boss object, an allied attack signal is transmitted respectively to each non-boss object after an interval; in a case that each non-boss object receives the allied attack signal, each non-boss object is marked and displayed, and a picture that at least two second virtual objects carry out allied attack on the first virtual object; and in a process that the boss object transmits the attack instruction, the boss object stops moving, and in a case that the non-boss objects receive the allied attack signal, the non-boss objects gather towards the boss object.

The attack instruction is used for indicating that at least two second virtual objects will launch the allied attack on the first virtual object. In a process of transmitting the attack instruction, the boss object may be specially marked, for example, special marks such as a progress bar, a bubble, an air mass, and the like are displayed right above the boss object. The attack instruction may be actions performed by the boss object such as jumping, shouting, waving command, and the like, which is not limited by the embodiments of this disclosure.

The interval may be greater than or equal to a display duration of the attack instruction, so that sufficient observation time and reaction time are reserved for the player. In a case that each non-boss object receives the allied attack signal, each non-boss object may be marked and displayed. For example, the non-boss object may be displayed with special effects, UI, and the like. By marking and displaying each non-boss object, it is indicated that each non-boss object already receives the allied attack signal, and may begin the allied attack on the first virtual object.

The allied attack may include same allied attack actions or combined attack actions. The allied attack action may be simultaneous charge, simultaneous jumping, simultaneous prop waving, simultaneous shooting, and the like. The combined attack action may be battle-group charge, combined attack skills, and the like.

A trigger condition of the attack instruction may include at least one of the following:

1. In a case that the number of the at least two second virtual objects is greater than or equal to a fifth threshold, the boss object transmits the attack instruction.

The fifth threshold is used for representing the corresponding number of the at least two second virtual objects, which is greater enough to launch the attack, and the fifth threshold may be set and regulated according to the practical use needs.

2. In a case that a difference between the maximal distance from the at least two second virtual objects to the first virtual object, and the minimal distance from the at least two second virtual objects to the first virtual object is less than or equal to a second distance threshold, the boss object transmits the attack instruction.

The second distance threshold is used for indicating the aggregation degree of the at least two second virtual objects, which is higher enough to launch the attack.

3. In a case that the distance between the boss object and the first virtual object is less than or equal to a third distance threshold, the boss object transmits the attack instruction.

The third distance threshold is used for indicating the distance between the boss object and the first virtual object, which is smaller enough to launch the attack. The third distance threshold may be set and regulated according to the practical use needs.

4. In a case that the first virtual object triggers the scenario setting, the boss object transmits the attack instruction.

The scenario setting may be that the first virtual object arrives at a set position, or the first virtual object fulfills a set task (for example, a kill count is greater than a threshold), and the like.

For the target non-boss object that is close enough to the first virtual object in the at least two second virtual objects, the target non-boss object may not be led by the boss object, that is, the target non-boss object may independently follow, attack, and conduct other actions on the first virtual objects.

Figure 8:
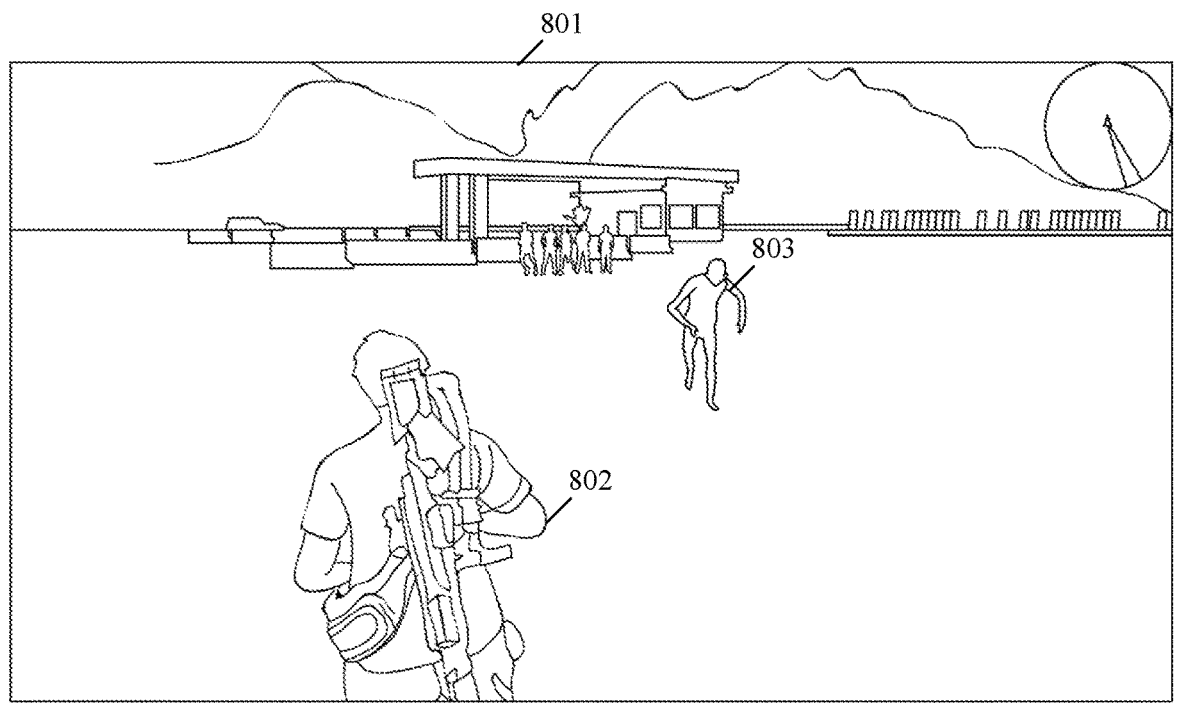
FIG. 8 is a schematic diagram of a group management method according to an embodiment of this disclosure.

For example, referring to FIG. 8, in the user interface 801, the first virtual object 802 corresponds to a plurality of second virtual objects. The non-boss object 803 in the plurality of second virtual objects is close enough to the first virtual object 802, so that the non-boss object 803 may independently follow, attack, and conduct other actions on the first virtual object 802, without being controlled by the boss object.

In conclusion, according to the technical schemes provided by the embodiments of this disclosure, by acquiring the at least two second virtual objects taking the first virtual object as the attack target, and supporting the boss object in the at least two second virtual objects to lead the non-boss objects in the at least two second virtual objects to perform group movement towards the first virtual object, the group control for the second virtual objects taking the first virtual object as the attack target is realized, and the problem that the second virtual objects gradually get out of the battle or gradually scatter during the pursuit of the first virtual object because the second virtual object (i.e. AI object) executes the independent universal logic template is avoided, thereby improving the position controllability of the second virtual objects during the pursuit.

In addition, the second virtual objects are grouped based on the first virtual object, so that the distribution of the second virtual objects in the pursuit scenario is more regular, the attack target of the second virtual objects is clearer, and the player may perform targeted operations based on the regular distribution and attack target of the first virtual object, thereby improving the player experience.

In addition, by using the technical scheme of this disclosure, the attacking and blocking rhythm of the second virtual object is clear, so that the defense or blocking rhythm of the player is clear, thereby further improving the player experience.

In addition, since the movement and attack of the non-boss objects are commanded by the boss object, the linked movement or attack of the second virtual objects is realized, so that the virtual environment picture is displayed more clearly and regularly.

Figure 9:
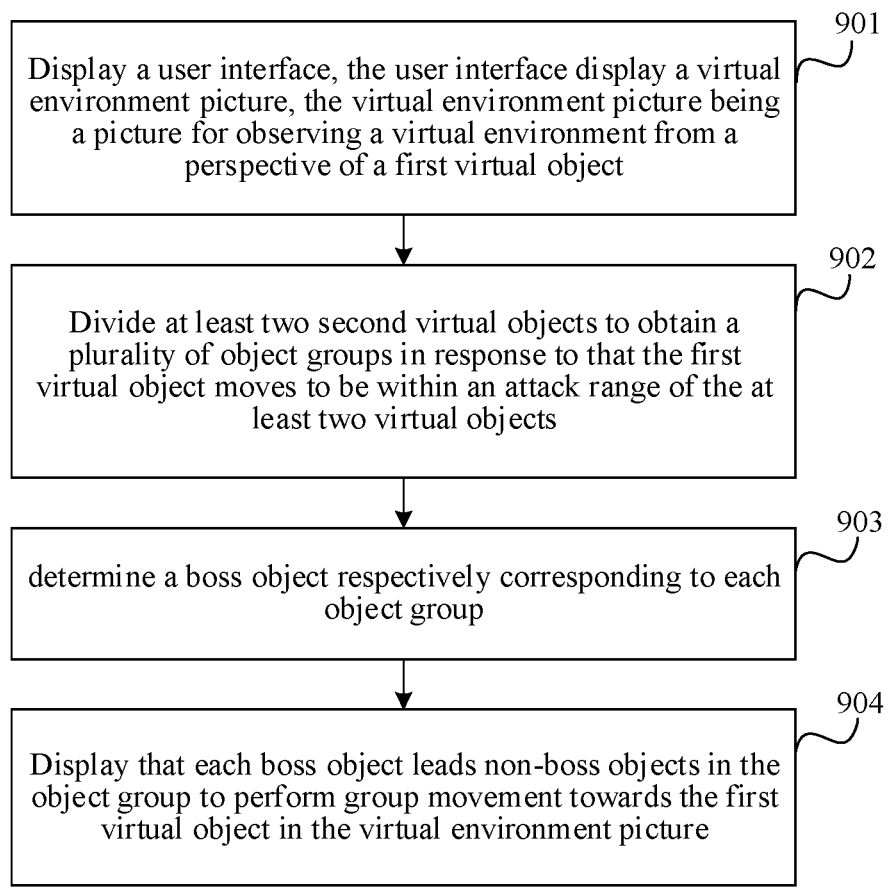
FIG. 9 is a flowchart of a virtual object control method according to another embodiment of this disclosure.

In an exemplary embodiment, in a case that the at least two second virtual objects are divided into a plurality of group objects, referring to FIG. 9, the virtual object control method may also be as follows:

Step 901: Display a user interface, the user interface displaying a virtual environment picture, the virtual environment picture being a picture for observing a virtual environment from a perspective of a first virtual object.

Step 901 is the same as the description in the foregoing embodiments. For the content that is not described in the embodiments of this disclosure, refer to the foregoing embodiments, which are not repeated here.

Step 902: Divide the at least two second virtual objects to obtain a plurality of object groups in response to that the first virtual object moves to be within the attack range of the at least two virtual objects.

The second virtual object refers to a virtual character (a virtual character controlled by a non-player) that is run in the application program according to certain logic, i.e. the AI object. The at least two second virtual objects each takes the first virtual object as the attack target.

In an embodiment, for the target object group in all object groups, the non-boss objects in the target object group gather towards the boss object corresponding to the target object group. The target object group is any one of the plurality of object groups. The boss object may be the second virtual object integrating an aggregation function and a leading function. For example, the boss object may be used as an aggregation point to gather the non-boss objects. The boss object may also be used as a leader to lead the non-boss objects to perform group movement towards the first virtual object. The non-boss object refers to the second virtual object except for the boss object in the at least two second virtual objects.

In an example, an object group division method may be as follows: the at least two second virtual objects are divided to obtain a plurality of object groups based on a distance between each second virtual object in the at least two second virtual objects; and for a first object group and a second object group in the plurality of object groups, the distance between the group members of the first object group and the group members of the second object group is greater than a first distance threshold, the distance between each group member of the first object group is less than or equal to the first distance threshold, and the distance between each group member of the second object group is less than or equal to the first distance threshold.

The first distance threshold is used for indicating the position distribution of each second virtual object in the virtual environment. By using the first distance threshold, the second virtual objects close to each other may be divided into the same object group, and the second virtual objects far away from each other may be divided into different object groups, so that block division is performed for the second virtual objects by using existing position distribution of the second virtual objects, and a plurality of group objects may be obtained more reasonably and conveniently.

For example, referring to FIG. 6, a plurality of second virtual objects in FIG. 6 may be divided to obtain an object group 605, an object group 606, and an object group 607. For the object group 605, the distance between each group member in the object group 605 is less than or equal to the first distance threshold, the distance between each group member of the object group 605 and each group member of the object group 606 is greater than the first distance threshold, and the distance between each group member of the object group 605 and each group member of the object group 607 is greater than the first distance threshold.

Step 903: Determine the boss object respectively corresponding to each object group.

The boss object of each object group may be determined respectively by the two boss object determination methods described in the foregoing embodiments. Exemplarily, for the target object group, in a case that the target object group includes a first type of second virtual objects, the first type of second virtual objects closest to the first virtual object is determined as the boss object of the target object group. In a case that the target object group does not include the first type of second virtual objects, the second type of second virtual objects closest to the first virtual object is determined as the boss object of the target object group.

For example, referring to FIG. 6, since there is only one first type of second virtual object (the elite monster shown in FIG. 6) in the object group 605 (or the object group 607), the first type of second virtual object may be directly determined as the boss object of the object group 605 (or the object group 607). The boss object 602 is the boss object of the object group 605, and the boss object 603 is the boss object of the object group 607. In response to no first type of second virtual objects in the object group 606, the second virtual object 604 closest to the first virtual object 601 may be determined as the boss object of the object group 606.

Step 904: Display that each boss object leads the non-boss objects in the object group to perform group movement towards the first virtual object.

For example, referring to FIG. 6, the boss object 602 leads the non-boss objects in the object group 605 to perform group movement towards the first virtual object 601. The boss object 603 leads the non-boss objects in the object group 607 to perform group movement towards the first virtual object 601. The boss object 604 leads the non-boss objects in the object group 606 to perform group movement towards the first virtual object 601.

In the process that the boss object leads the non-boss objects to perform group movement towards the first virtual object, the object groups may be merged according to a practical scenario, and the specific content may be as follows:

in an example, for the target object group in a plurality of object groups, in a case that the number of the group members of the target object group is less than or equal to a first threshold, the group members of the target object group are added into the object group adjacent to the target object group; and the boss object of the object group adjacent to the target object group is redetermined.

The first threshold is used for indicating that the group members in the object group are too few. The first threshold may be set and regulated according to the practical use needs, such as 3, 4, 5, and the like. The object group adjacent to the target object group may refer to the object group with the distance to the target object group less than a set distance. In a case that there are a plurality of object groups adjacent to the target object group, the group members of the target object group may be dispersed into the plurality of object groups adjacent to the target object group.

Exemplarily, referring to FIG. 6, by letting the first threshold be 6, the object group 606 is adjacent to the object group 605. Since the number of the group members in the object group 606 is 5, which is less than the first threshold, the group members in the object group 606 may be merged into the object group 605. Then, the boss object of the object group 605 is redetermined, or the boss object 602 of the object group 605 may also be reserved.

In a case that the number of the group members of the target object group is less than or equal to the first threshold, the group members of the target object group may also be added into the object group closest to the target object group.

In another example, in a case that the number of the object groups is greater than a second threshold, a target number of object groups is selected from a plurality of object groups, and the target number is a difference between the number of the object groups and the second threshold; the group members of the target number of object groups are dispersed into another object group in the plurality of object groups; and the boss object of another object group is redetermined.

The second threshold is used for indicating that the group members in the object group are too more. The second threshold may be set and regulated according to the practical use needs, such as 4, 5, 6, and the like. The target number of object groups may be randomly selected from a plurality of object groups, the target number of object groups with fewer group members may be selected from a plurality of object groups, or the target number of object groups with more group members may be selected from a plurality of object groups, which is not limited by the embodiments of this disclosure.

The group members of the target number of object groups may also be added into other object groups closest thereto respectively.

According to the embodiments of this disclosure, by supporting the merging of object groups, the complexity in group management is reduced, thereby reducing the pressure of group management.

In the process that the boss object leads the non-boss object to perform group movement towards the first virtual object, the object groups may also be split according to the practical scenario, and the specific content may be as follows:

in an example, for the target object group in a plurality of object groups, in a case that the number of the group members of the target object group is greater than a third threshold, the target object group is split to obtain at least two new object groups.

The third threshold is used for indicating that the group members in the target object group are too more. The third threshold may be set and regulated according to the practical use needs. The boss object of the new object groups obtained by splitting may be determined respectively by the method provided in the foregoing embodiments.

In an example, for the target object group in a plurality of object groups, in a case that a dispersion degree of the group members of the target object group is greater than a fourth threshold, the target object group is split to obtain at least two new object groups.

The fourth threshold is used for indicating that the group members of the target object group are too scattered. The fourth threshold may be set and regulated according to the practical use needs. The boss object of the new object groups obtained by splitting may be determined respectively by the method provided in the foregoing embodiments.

In conclusion, according to the technical schemes provided by the embodiments of this disclosure, by acquiring the at least two second virtual objects taking the first virtual object as the attack target, and supporting the boss object in the at least two second virtual objects to lead the non-boss objects in the at least two second virtual objects to perform group movement towards the first virtual object, the group control for the second virtual objects taking the first virtual object as the attack target is realized, and the problem that the second virtual objects gradually get out of the battle or gradually scatter during the pursuit of the first virtual object because the second virtual object (i.e. AI object) executes the independent universal logic template is avoided, thereby improving the position controllability of the second virtual objects during the pursuit.

In addition, the second virtual objects are grouped based on the first virtual object, so that the distribution of the second virtual objects in the pursuit scenario is more regular, and the player may perform targeted operations based on the regular distribution of the first virtual object, thereby improving the player experience.

Figure 10:
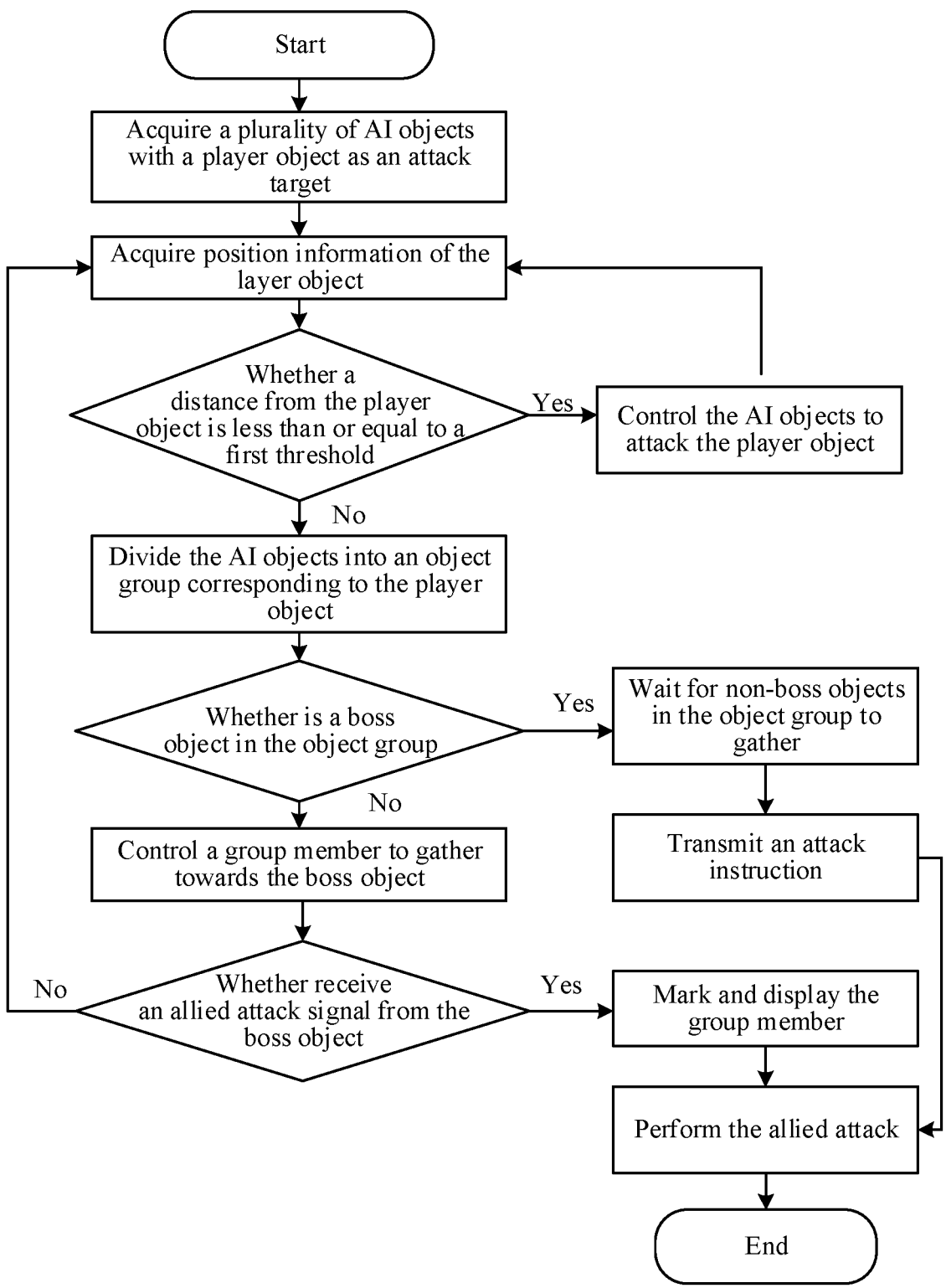
FIG. 10 is a flowchart of a virtual object control method according to another embodiment of this disclosure.

In an exemplary embodiment, referring to FIG. 10, by taking PVE games as an example, a virtual object control method provided by the embodiments of this disclosure may be as follows:

The client acquires a plurality of AI objects with the player object as the attack target. The player object is the foregoing first virtual object, and the AI object is the foregoing second virtual object. For example, in a case that the player object moves to be within the attack range of the target AI object, the attack target of the target AI object is determined as the player object.

The client acquires the position information of the player object, and the corresponding position information of a plurality of AI objects. The client calculates a distance between each of the plurality of first AI objects and the player object according to the position information of the player object and the corresponding position information of each of the plurality of AI objects.

For the target AI object in the plurality of AI objects, in a case that the distance between the target AI object and the player object is less than or equal to the first threshold, the client controls the target AI object to attack the player object. In an embodiment, in a case that the target AI object belongs to the object group corresponding to the player object, the target AI object is removed from the object group. After the attack of the target AI object is completed, the distance between the target AI object and the player object is continuously acquired, and compared with the first threshold.

In a case that the distance between the target AI object and the player object is greater than the first threshold, the client divides the target AI object into the object group corresponding to the player object.

The client performs the above comparison on the plurality of AI objects respectively to obtain the object groups corresponding to the player object.

The client determines the boss object in the object group. The boss object and the boss object determination method are the same as the description in the foregoing embodiments, and are not described in detail here.

For any group member in the object group, identity comparison is performed on the group member, and in a case that the group member is the boss object, the boss object waits for the non-boss objects in the object group to gather. In a case that the aggregation degree of the non-boss objects is high enough, the boss object transmits the attack instruction, and transmits the allied attack signal to each non-boss object.

In a case that the group member is the non-boss object, the client controls the group member to gather towards the boss object. In a case that the group member receives the allied attack signal from the boss object, the client marks and displays the group member. In a case that the group member does not receive the allied attack signal from the boss object, the client continues to acquire the position information of the group member, and determines whether to directly attack the virtual object.

In a case that all non-boss objects in the object group receive the allied attack signal from the boss object, the client controls the non-boss objects and the boss object in the object group to perform allied attack on a player character.

In conclusion, according to the technical schemes provided by the embodiments of this disclosure, by acquiring the at least two second virtual objects taking the first virtual object as the attack target, and supporting the boss object in the at least two second virtual objects to lead the non-boss objects in the at least two second virtual objects to perform group movement towards the first virtual object, the group control for the second virtual objects taking the first virtual object as the attack target is realized, and the problem that the second virtual objects gradually get out of the battle or gradually scatter during the pursuit of the first virtual object because the second virtual object (i.e. AI object) executes the independent universal logic template is avoided, thereby improving the position controllability of the second virtual objects during the pursuit.

In addition, the second virtual objects are grouped based on the first virtual object, so that the distribution of the second virtual objects in the pursuit scenario is more regular, and the player may perform targeted operations based on the regular distribution of the first virtual object, thereby improving the player experience.

The following describes apparatus embodiments of this disclosure, which may be used for executing the method embodiments of this disclosure. For details not disclosed in the apparatus embodiments of this disclosure, refer to the method embodiments of this disclosure.

Figure 11:
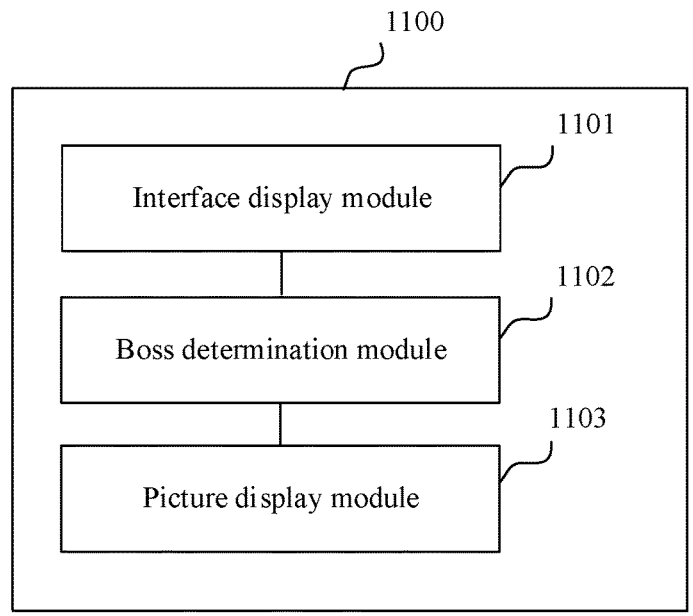
FIG. 11 is a block diagram of a virtual object control apparatus according to an embodiment of this disclosure.

Referring to FIG. 11, FIG. 11 is a block diagram of a virtual object control apparatus according to an embodiment of this disclosure. The apparatus has a function of performing the foregoing method examples, the function may be implemented by hardware or may be implemented by hardware executing corresponding software. The apparatus may be the terminal illustrated above, and may also be arranged in the terminal. As shown in FIG. 11, the apparatus 1100 includes:

an interface display module 1101, a boss determination module 1102, and a picture display module 1103.

The interface display module 1101 is configured to display a user interface, the user interface displaying a virtual environment picture, the virtual environment picture being a picture for observing a virtual environment from a perspective of a first virtual object.

The boss determination module 1102 is configured to determine a boss object from at least two second virtual objects in response to that the first virtual object moves to be within an attack range of the at least two second virtual objects, a non-boss object of the at least two second virtual objects gathering towards the boss object.

The picture display module 1103 is configured to display that the boss object leads the non-boss object to perform group movements towards the first virtual object in the virtual environment picture.

Figure 12:
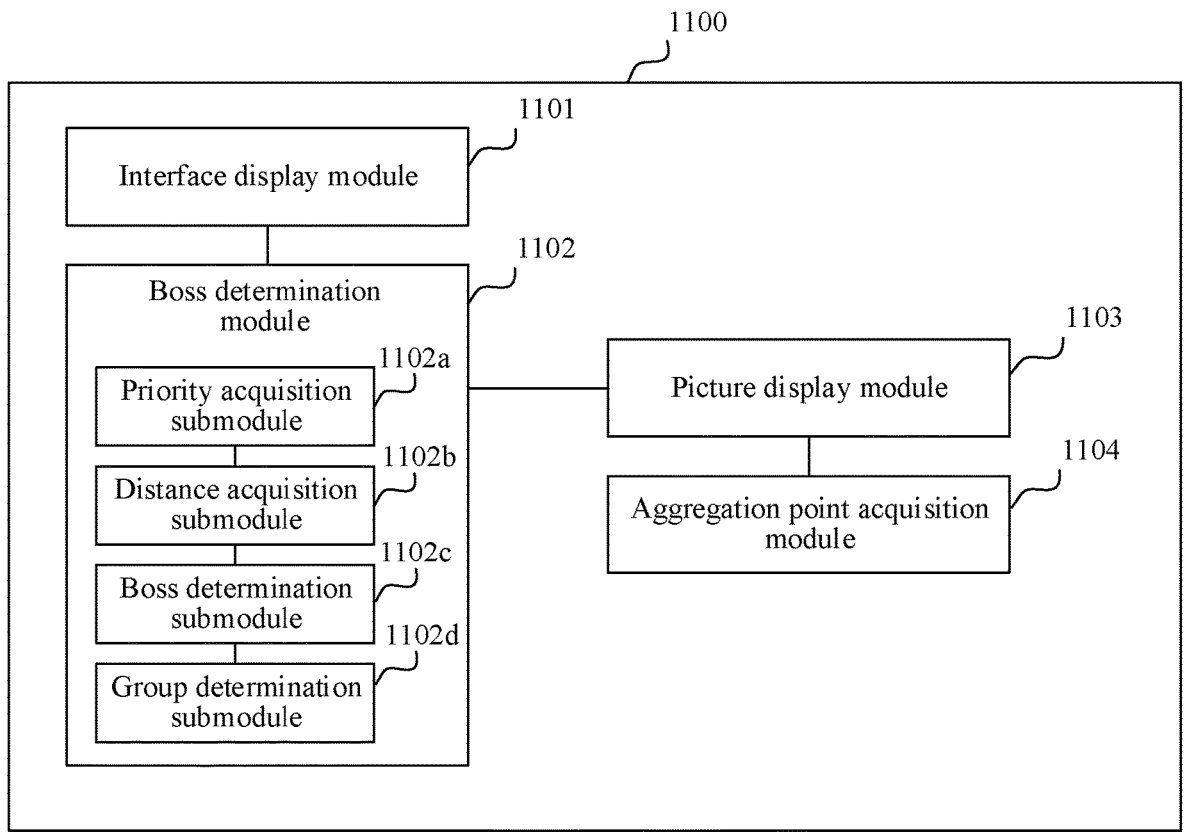
FIG. 12 is a block diagram of a virtual object control apparatus according to another embodiment of this disclosure.

In an exemplary embodiment, as shown in FIG. 12, the boss determination module 1102 includes: a priority acquisition submodule 1102a, a distance acquisition submodule 1102b, and a boss determination submodule 1102c.

The priority acquisition submodule 1102a is configured to acquire boss priority respectively corresponding to the at least two second virtual objects, and the boss priority is used for indicating the priority that the second virtual object is determined as the boss object.

The distance acquisition submodule 1102b is configured to acquire a distance between the at least two second virtual objects and the first virtual object respectively.

The boss determination submodule 1102c is configured to determine the boss object from the at least two second virtual objects based on the boss priority respectively corresponding to the at least two second virtual objects, and the distance between the at least two second virtual objects and the first virtual object.

In an exemplary embodiment, the boss determination submodule 1102c is configured to:

sort the at least two second virtual objects according to an ascending order of the boss priority to obtain a first sequence;

sort the at least two second virtual objects according to a descending order of the distance to obtain a second sequence;

determine a boss score respectively corresponding to the at least two second virtual objects based on a position of the second virtual object in the first sequence and the second sequence, the boss score being used for indicating the possibility that the second virtual object is set as the boss object; and determine the second virtual object with the boss score greater than or equal to a score threshold as the boss object.

In another exemplary embodiment, the second virtual object includes a first type of second virtual objects and a second type of second virtual objects, the boss priority of the first type of second virtual objects is higher than the boss priority of the second type of second virtual objects, and the boss priority is used for indicating the priority that the second virtual object is determined as the boss object; The boss determination module 1102 is further configured to:

determine the first type of second virtual objects closest to the first virtual object in the at least two second virtual objects as the boss object in a case that the at least two second virtual objects include the first type of second virtual objects; and determine the second type of second virtual objects closest to the first virtual object in the at least two second virtual objects as the boss object in a case that the at least two second virtual objects do not include the first type of second virtual objects.

In an exemplary embodiment, the boss determination module 1102 is further configured to:

determine a new boss object from the remaining second virtual objects corresponding to the at least two second virtual objects in response to the death of the boss object;

or, determine the new boss object from the remaining second virtual objects corresponding to the at least two second virtual objects in a case that the boss object gets out of the battle.

In an exemplary embodiment, as shown in FIG. 12, the boss determination module 1102 further includes: a group determination submodule 1102*d*.

The group determination submodule 1102*d* is configured to determine the at least two second virtual objects as group members of the object group corresponding to the first virtual object.

The group determination submodule 1102*d* is further configured to add the new second virtual object to the updated object group in response to that the first virtual object moves to be within the attack range of the new second virtual object.

The boss determination submodule 1102*c* is further configured to determine the new boss object from the updated object group.

In an exemplary embodiment, the group determination submodule 1102*d* is further configured to divide the at least two second virtual objects to obtain a plurality of object groups.

The boss determination submodule 1102*c* is further configured to determine the boss object respectively corresponding to each object group, for the target object group in various object groups, the non-boss objects in the target object group gather towards the boss object corresponding to the target object group.

In an exemplary embodiment, the group determination submodule 1102*d* is further configured to:

divide the at least two second virtual objects to obtain a plurality of object groups based on the distance between each second virtual object in the at least two second virtual objects, for the first object group and the second object group in the plurality of object groups, the distance between the group member of the first object group and the group member of the second object group being greater than the first distance threshold, and the distance between each group member of the first object group or the second object group being less than or equal to the first distance threshold.

In an exemplary embodiment, the group determination submodule 1102*d* is further configured to add the group members of the target object group into the object group adjacent to the target object group in a case that the number of the group members of the target object group is less than or equal to the first threshold for the target object group in the plurality of object groups.

The boss determination submodule 1102*c* is further configured to redetermined the boss object of the object group adjacent to the target object group.

In an exemplary embodiment, the group determination submodule 1102*d* is further configured to select a target number of object groups from a plurality of object groups in a case that the number of the object groups is greater than a second threshold, and the target number is a difference between the number of the object groups and the second threshold.

The group determination submodule 1102*d* is further configured to disperse the group members of the target number of object groups into other object groups in the plurality of object groups.

The boss determination submodule 1102*c* is further configured to redetermined the boss object of other object groups.

In an exemplary embodiment, the group determination submodule 1102*d* is further configured to:

split the target object group to obtain at least two new object groups in a case that the number of group members of the target object group is greater than a third threshold for the target object group in a plurality of object groups;

or split the target object group to obtain at least two new object groups in a case that the dispersion degree of the group members of the target object group is greater than a fourth threshold for the target object group in a plurality of object groups.

In an exemplary embodiment, the group determination submodule 1102*d* is further configured to:

determine the at least two second virtual objects as group members of the object group corresponding to the first virtual object; and add the group members of the object group into the object group corresponding to another first virtual object in a case that the group members of the object group lose the first virtual object, and in a case of the existence of another first virtual object located within the attack range of the group members of the object group.

In an exemplary embodiment, the picture display module 1103 is configured to:

transmit an allied attack signal to each non-boss object after an interval in response to an attack instruction transmitted by the boss object;

mark and display each non-boss object, and display a picture that the at least two second virtual objects perform the allied attack on the first virtual object in a case that each non-boss object receives the allied attack signal, in a process that the boss object transmitting the attack instruction, the boss object stopping moving, and in a case that the non-boss objects receiving the allied attack signal, the non-boss objects gathering towards the boss object.

In an exemplary embodiment, in a case that the corresponding number of the at least two second virtual objects is greater than or equal to the fifth threshold, the boss object transmits the attack instruction;

or, in a case that a difference between the maximal distance between the at least two second virtual objects and the first virtual object, and the minimal distance between the at least two second virtual objects and the first virtual object is less than or equal to the second distance threshold, the boss object transmits the attack instruction;

or, in a case that the distance between the boss object and the first virtual object is less than or equal to the third distance threshold, the boss object transmits the attack instruction;

or, in a case that the first virtual object triggers the scenario setting, the boss object transmits the attack instruction.

In an exemplary embodiment, in a case that the difference between the maximal distance from the at least two second virtual objects to the first virtual object, and a minimal distance from the at least two second virtual objects to the first virtual object is greater than the fourth distance threshold, the boss object stops moving, and the non-boss objects in the at least two second virtual objects continue to gather towards the boss object; and in a case that the difference between the maximal distance from the at least two second virtual objects to the first virtual object, and the minimal distance from the at least two second virtual objects to the first virtual object is less than or equal to the fifth distance threshold, the boss object continues to lead the non-boss objects to perform the group movement towards the first virtual object.

In an exemplary embodiment, as shown in FIG. 12, the apparatus 1100 further includes: an aggregation point acquisition module 1104.

The aggregation point acquisition module 1104 is configured to acquire an aggregation point in the virtual environment, the aggregation priority of the aggregation point is higher than the aggregation priority of the boss object.

The picture display module 1103 is further configured to display that at least two second virtual objects gather towards the aggregation point in a case of the existence of the aggregation point.

The picture display module 1103 is further configured to display that the non-boss objects in the at least two second virtual objects gather towards the boss object without the aggregation point.

In conclusion, according to the technical schemes provided by the embodiments of this disclosure, by acquiring the at least two second virtual objects taking the first virtual object as the attack target, and supporting the boss object in the at least two second virtual objects to lead the non-boss objects in the at least two second virtual objects to perform group movement towards the first virtual object, the group control for the second virtual objects taking the first virtual object as the attack target is realized, and the problem that the second virtual objects gradually get out of the battle or gradually scatter during the pursuit of the first virtual object because the second virtual object (i.e. AI object) executes the independent universal logic template is avoided, thereby improving the position controllability of the second virtual objects during the pursuit.

In addition, the second virtual objects are grouped based on the first virtual object, so that the distribution of the second virtual objects in the pursuit scenario is more regular, and the player may perform targeted operations based on the regular distribution of the first virtual object, thereby improving the player experience.

It is to be noted that, when the apparatus provided in the foregoing embodiment implements the functions of the apparatus, only division of the foregoing function modules is used as an example for description. In the practical application, the functions may be allocated to and completed by different function modules according to requirements. That is, an internal structure of the device is divided into different function modules to complete all or some of the functions described above. In addition, the apparatus provided in the foregoing embodiments and the method embodiments fall within a same conception. For details of a specific implementation process, refer to the method embodiments. Details are not described herein again.

Figure 13:
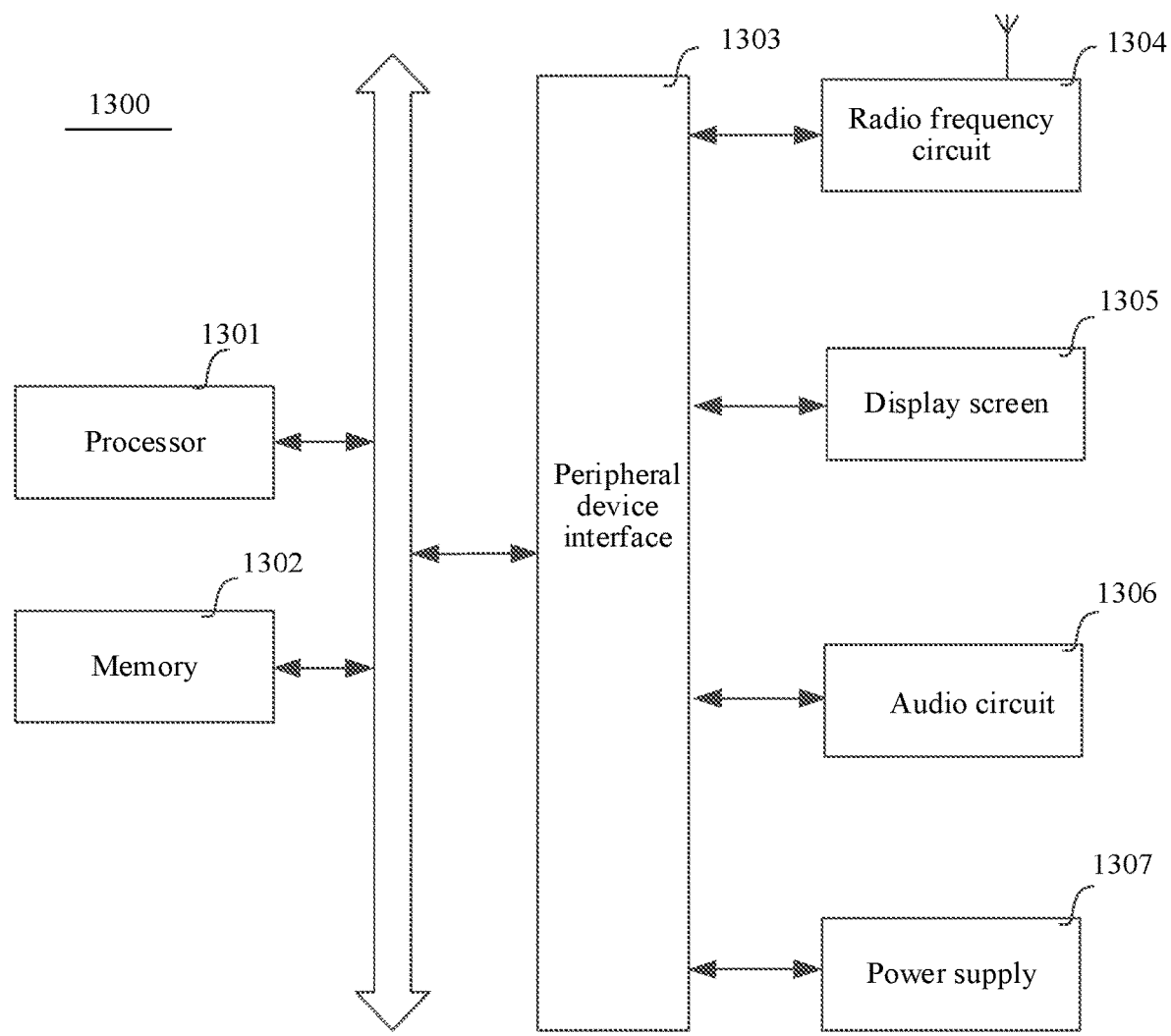
FIG. 13 is a block diagram of a terminal according to an embodiment of this disclosure.

Referring to FIG. 13, FIG. 13 is a block diagram of a terminal 1300 according to an embodiment of this disclosure. The terminal is configured to perform the virtual object control method provided in the foregoing embodiments. The terminal may be the terminal 10 in an implementation environment shown in FIG. 1, specifically as follows:

The terminal 1300 generally includes: a processor 1301 (processing circuitry) and a memory 1302 (non-transitory computer-readable storage medium).

The processor 1301 may include one or more processing cores, for example, a 4-core processor or an 8-core processor. the processor 1301 may be implemented in at least one hardware form of a digital signal processor (DSP), a field-programmable gate array (FPGA), and a programmable logic array (PLA). The processor 1301 may also include a main processor and a co-processor. The main processor is a processor configured to process data in an awake state, and is also referred to as a central processing unit (CPU). The co-processor is a low power consumption processor configured to process the data in a standby state. In some embodiments, the processor 1301 may be integrated with a graphics processing unit (GPU). The GPU is configured to render and draw content that needs to be displayed on a display screen. In some embodiments, the processor 1301 may further include an artificial intelligence (AI) processor. The AI processor is configured to process computing operations related to machine learning.

The memory 1302 may include one or more computer-readable storage media. The computer-readable storage medium may be non-transient. The memory 1302 may further include a high-speed random access memory and a nonvolatile memory, such as one or more disk storage devices or flash storage devices. In some embodiments, a non-transient computer-readable storage medium in the memory 1302 is configured to store at least one computer-readable instruction, at least one program, and a code set or an instruction set, and the at least one instruction, the at least one program, and the code set or the instruction set is executed by one or more processors to implement the virtual object control method.

In some embodiments, the terminal 1300 may further include: a peripheral device interface 1303 and at least one peripheral device. The processor 1301, the memory 1302, and the peripheral device interface 1303 may be connected through a bus or a signal cable. Each peripheral device may be connected to the peripheral device interface 1303 through a bus, a signal cable, or a circuit board. Specifically, the peripheral device includes: at least one of a radio frequency (RF) circuit 1304, a display screen 1305, an audio circuit 1306, and a power supply 1307.

A person skilled in the art may understand that the structure shown in FIG. 13 constitutes no limitation on the terminal 1300, and the terminal may include more or fewer components than those shown in the figure, or some components may be combined, or a different component deployment may be used.

In an exemplary embodiment, a computer-readable storage medium is further provided. The storage medium stores at least one computer-readable instruction, at least one program, and a code set or an instruction set, the at least one computer-readable instruction, the at least one program, the code set or the instruction set being executed by a processor to implement the virtual object control method.

The computer-readable storage medium may include: a read-only memory (ROM), a random access memory (RAM), a solid state drive (SSD), an optical disc, or the like. The RAM may include a resistance random access memory (ReRAM) and a dynamic random access memory (DRAM).

In an exemplary embodiment, a computer program product or a computer program is further provided, the computer program product or the computer program including a computer-readable instruction, the computer-readable instruction being stored in a computer-readable storage medium. A processor of a terminal reads the computer-readable instruction from the computer-readable storage medium, and the processor executes the computer-readable instruction to make the terminal execute the virtual object control method.

It is to be noted that, the information (including but not limited to device information of the object, personal information of the object, and the like), data (including but not limited to data for analysis, stored data, and to-be-displayed data), and signals involved in this disclosure are all authorized by the object or fully authorized by all parties, and the collection, use and processing of relevant data need to comply with relevant laws, regulations and standards of relevant countries and regions. For example, the player operation data involved in this disclosure is acquired with full authorization.

"A plurality of" mentioned in the specification means two or more. "And/or" describes an association relationship for describing associated objects and represents that three relationships may exist. For example, A and/or B may represent the following three cases: only A exists, both A and B exist, and only B exists. The character "/" in this specification generally indicates an "or" relationship between the associated objects. In addition, the step numbers described in this specification merely exemplarily show a possible execution sequence of the steps. In some other embodiments, the steps may not be performed according to the number sequence. For example, two steps with different numbers may be performed simultaneously, or two steps with different numbers may be performed according to a sequence contrary to the sequence shown in the figure. This is not limited in the embodiments of this disclosure.

The term module (and other similar terms such as unit, submodule, etc.) in this disclosure may refer to a software module, a hardware module, or a combination thereof. A software module (e.g., computer program) may be developed using a computer programming language. A hardware module may be implemented using processing circuitry and/or memory. Each module can be implemented using one or more processors (or processors and memory). Likewise, a processor (or processors and memory) can be used to implement one or more modules. Moreover, each module can be part of an overall module that includes the functionalities of the module.

The use of "at least one of" in the disclosure is intended to include any one or a combination of the recited elements. For example, references to at least one of A, B, or C; at least one of A, B, and C; at least one of A, B, and/or C; and at least one of A to C are intended to include only A, only B, only C or any combination thereof.

The foregoing disclosure includes some exemplary embodiments of this disclosure which are not intended to limit the scope of this disclosure. Other embodiments shall also fall within the scope of this disclosure.

What is claimed is:

1. A virtual object control method, comprising:
   displaying a virtual environment picture of a virtual environment including a first virtual object;
   determining a leader virtual object from among at least two non-player character virtual objects in response to a determination that the first virtual object is within an attack range of the at least two non-player character virtual objects, a non-leader virtual object of the at least two non-player character virtual objects moving towards the leader virtual object; and
   displaying, in the virtual environment, group movement of the at least two non-player character virtual objects led by the leader virtual object towards the first virtual object.

2. The method according to claim 1, wherein the determining the leader virtual object comprises:
   acquiring a leader priority respectively for each of the at least two non-player character virtual objects, the leader priority indicating a priority of the respective non-player character virtual object to be determined as the leader virtual object;
   acquiring a distance between the at least two non-player character virtual objects and the first virtual object; and
   determining the leader virtual object based on the leader priority respectively corresponding to each of the at least two non-player character virtual objects, and based on the distance between the at least two non-player character virtual objects and the first virtual object.

3. The method according to claim 2, wherein the determining the leader virtual object based on the leader priority and the distance comprises:
   sorting the at least two non-player character virtual objects according to an ascending order of leader priority to obtain a first sequence;
   sorting the at least two non-player character virtual objects according to a descending order of the distance to obtain a second sequence;
   determining a leader score respectively corresponding to each of the at least two non-player character virtual objects based on a position of the respective non-player character virtual object in the first sequence and the second sequence, the leader score indicating a possibility that the respective non-player character virtual object will be set as the leader virtual object; and
   determining a non-player character virtual object with a leader score greater than or equal to a score threshold as the leader virtual object.

4. The method according to claim 1, wherein
   the non-player character virtual objects comprise a first type of non-player character virtual objects and a second type of non-player character virtual objects;
   a leader priority of the first type of non-player character virtual objects is higher than the leader priority of the second type of non-player character virtual objects, and the leader priority indicating a priority that a non-player character virtual object will be determined as the leader object; and
   the determining the leader object comprises:
      identifying a non-player character virtual object of the first type that is closest to the first virtual object among the at least two non-player character virtual objects as the leader virtual object in response to a determination that the at least two non-player character virtual objects comprise the first type of non-player character virtual objects; and identifying a non-player character of the second type that is closest to the first virtual object among the at least two non-player character virtual objects as the leader virtual object in response to a determination that the at least two non-player character virtual objects do not comprise the first type of non-player character virtual objects.

5. The method according to claim 1, wherein, after the determining the leader virtual object, the method further comprises:
determining a new leader virtual object from remaining non-player character virtual objects corresponding to the at least two non-player character virtual objects in response to death of the leader virtual object; or
determining the new leader virtual object from remaining non-player character virtual objects corresponding to the at least two non-player character virtual objects in response to the leader virtual object leaving battle in the virtual environment.

6. The method according to claim 1, wherein, after the determining the leader virtual object, the method further comprises:
determining the at least two non-player character virtual objects as group members of an object group corresponding to the first virtual object;
adding a new non-player character virtual object to the object group to obtain an updated object group in response to a determination that the first virtual object is within attack range of the new non-player character virtual object; and
determining a new leader virtual object from the updated object group.

7. The method according to claim 1, wherein the determining the leader virtual object comprises:
dividing the at least two non-player character virtual objects to obtain a plurality of object groups; and
determining a leader virtual object respectively corresponding to each object group,
wherein for each object group in the object groups, non-leader virtual objects in the respective object group move towards the leader virtual object corresponding to the respective object group.

8. The method according to claim 7, wherein the dividing the at least two non-player character virtual objects comprises:
dividing the at least two non-player character virtual objects to obtain the plurality of object groups based on a distance between non-player character virtual objects in the at least two non-player character virtual objects; and
for a first object group and a second object group in the plurality of object groups, a distance between a group member of the first object group and a group member of the second object group is greater than a first distance threshold, and a distance between group members of the first object group is less than or equal to the first distance threshold.

9. The method according to claim 7, wherein, after dividing the at least two non-player character virtual objects to obtain the plurality of object groups, the method further comprises:
adding group members of a first object group to an object group adjacent to the first object group in response to a determination that a number of non-player character virtual objects in the first object group is less than or equal to a first threshold; and
redetermining the leader virtual object of the object group adjacent to the first object group.

10. The method according to claim 7, wherein, after the dividing the at least two non-player character virtual objects to obtain the plurality of object groups, the method further comprises:
selecting a target number of object groups from the plurality of object groups in response to a determination that a number of the plurality of object groups is greater than a second threshold, the target number being a difference between the number of the plurality of object groups and the second threshold;
dispersing non-player character virtual objects of the target number of object groups into one or more other object groups in the plurality of object groups; and
redetermining the leader virtual object of the one or more other object groups.

11. The method according to claim 7, wherein, after the dividing the at least two non-player character virtual objects to obtain the plurality of object groups, the method further comprises:
splitting a first object group to obtain at least two new object groups in response to a determination that a number of non-player characters in the first object group is greater than a third threshold; or
splitting a second object group to obtain at least two new object groups in response to a determination that a dispersion degree of non-player characters in the second object group is greater than a fourth threshold.

12. The method according to claim 1, further comprising:
determining the at least two non-player character virtual objects as group members of an object group corresponding to the first virtual object; and
adding the group members of the object group corresponding to the first virtual object into an object group corresponding to another first virtual object in response to a determination that (i) the group members of the object group lose the first virtual object, and (ii) the another first virtual object is located within attack range of the group members of the object group corresponding to the first virtual object.

13. The method according to claim 1, wherein after, displaying the group movement, the method further comprises:
transmitting an allied attack signal to each non-leader virtual object in response to an attack instruction transmitted by the leader virtual object; and
displaying, in the virtual environment, an allied attack performed by the at least two non-player character virtual objects on the first virtual object when each non-leader virtual object receives the allied attack signal,
wherein, when the leader virtual object transmits the attack instruction, the leader virtual object stops moving, and, in response to receiving the allied attack signal, non-leader virtual objects move towards the leader virtual object.

14. The method according to claim 13, further comprising:
transmitting, by the leader virtual object, the attack instruction in response to a determination that a number of the at least two non-player character virtual objects is greater than or equal to a fifth threshold;
or
transmitting, by the leader virtual object, the attack instruction in response to a determination that a difference between a maximal distance from the at least two non-player character virtual objects to the first virtual object, and a minimal distance from the at least two non-player character virtual objects to the first virtual object is less than or equal to a second distance threshold;

or transmitting, by the leader virtual object, the attack instruction in response to a determination that a distance between the leader virtual object and the first virtual object is less than or equal to a third distance threshold;

or transmitting, by the leader virtual object, the attack instruction in response to a determination that the first virtual object triggers an attack scenario.

15. The method according to claim 1, further comprising:

stopping the leader virtual object, and continuing the movement of non-leader virtual objects in the at least two non-player character virtual objects towards the leader virtual object in response to a determination that a difference between a maximal distance from the at least two non-player character virtual objects to the first virtual object, and a minimal distance from the at least two non-player character virtual objects to the first virtual object is greater than a fourth distance threshold; and continuously leading, by the leader virtual object, the non-leader virtual objects to perform group movements towards the first virtual object in response to a determination that the difference between the maximal distance from the at least two non-player character virtual objects to the first virtual object, and the minimal distance from the at least two non-player character virtual objects to the first virtual object is less than or equal to a fifth distance threshold.

16. The method according to claim 1, further comprising:

acquiring an aggregation point in the virtual environment;

displaying, in the virtual environment, the at least two non-player character virtual objects moving towards the aggregation point in when the aggregation point exists; and displaying that non-leader virtual objects in the at least two non-player character virtual objects move towards the leader virtual object when the aggregation point does not exist.

17. A virtual object control apparatus, comprising:

processing circuitry configured to display a virtual environment picture of a virtual environment including a first virtual object;

determine a leader virtual object from among at least two non-player character virtual objects in response to a determination that the first virtual object is within an attack range of the at least two non-player character virtual objects, a non-leader virtual object of the at least two non-player character virtual objects moving towards the leader virtual object; and display, in the virtual environment, group movement of the at least two non-player character virtual objects led by the leader virtual object towards the first virtual object.

18. The apparatus according to claim 17, wherein the processing circuitry is further configured to:

acquire a leader priority respectively for each of the at least two non-player character virtual objects, the leader priority indicating a priority of the respective non-player character virtual object to be determined as the leader virtual object;

acquire a distance between the at least two non-player character virtual objects and the first virtual object; and determine the leader virtual object based on the leader priority respectively corresponding to each of the at least two non-player character virtual objects, and based on the distance between the at least two non-player character virtual objects and the first virtual object.

19. The apparatus according to claim 18, wherein the processing circuitry is further configured to:

sort the at least two non-player character virtual objects according to an ascending order of leader priority to obtain a first sequence;

sort the at least two non-player character virtual objects according to a descending order of the distance to obtain a second sequence;

determine a leader score respectively corresponding to each of the at least two non-player character virtual objects based on a position of the respective non-player character virtual object in the first sequence and the second sequence, the leader score indicating a possibility that the respective non-player character virtual object will be set as the leader virtual object; and determine a non-player character virtual object with a leader score greater than or equal to a score threshold as the leader virtual object.

20. A non-transitory computer-readable storage medium storing computer-readable instructions thereon, which, when executed by processing circuitry, cause the processing circuitry to perform a virtual object control method comprising:

displaying a virtual environment picture of a virtual environment including a first virtual object;

determining a leader virtual object from among at least two non-player character virtual objects in response to a determination that the first virtual object is within an attack range of the at least two non-player character virtual objects, a non-leader virtual object of the at least two non-player character virtual objects moving towards the leader virtual object; and displaying, in the virtual environment, group movement of the at least two non-player character virtual objects led by the leader virtual object towards the first virtual object.

* * * * *